124,413

UNITED STATES PATENT OFFICE.

JOZE R. WESTOVER, OF TOWN HILL, PENNSYLVANIA.

IMPROVEMENT IN COMPOUNDS FOR FRUIT-TREES, &c.

Specification forming part of Letters Patent No. 124,413, dated March 5, 1872.

*To all whom it may concern:*

Be it known that I, JOZE R. WESTOVER, of Town Hill, in the county of Luzerne and State of Pennsylvania, have invented a new and useful Compound for Growing Fruit-Trees and Shrubbery; and I do hereby declare that the following is a full, clear, and exact description thereof, which will enable others to make and use the same.

This invention relates to a new and useful compound having for its object the destruction of insects that infest the trunk and roots of fruit-trees, and also acts as a fertilizer for trees and shrubbery; and consists in mixing kerosene-oil, fish-oil, sulphur, and saltpetre in proportion as follows:

To one quart of kerosene-oil add one pint of fish-oil, one-half pound flower of sulphur, one-fourth pound pulverized saltpetre, and one pint of water. Thus proportioned it produces an insect-destroying and fertilizing compound for fruit-trees and shrubbery.

Having thus described my invention, I claim as new and desire to secure by Letters Patent—

The compound consisting of the ingredients herein described and mixed in the proportions and manner substantially as specified and its adaptation as a preserver and fertilizer of fruit-trees and shrubbery.

JOZE R. WESTOVER.

Witnesses:
 E. W. B. PHILLIPS,
 J. M. EMORY.